United States Patent Office 3,282,843
Patented Nov. 1, 1966

3,282,843
EMULSIFIER COMPOSITIONS
James R. Alburger, 5007 Hillard Ave., La Canada, Calif.
No Drawing. Filed Jan. 14, 1966, Ser. No. 520,392
20 Claims. (Cl. 252—52)

This application is a continuation-in-part of application, Serial No. 256,128, filed February 4, 1963, for "Emulsifier Compositions."

The present invention relates to emulsifier compositions, and more particularly to such compositions which are capable of maintaining oily materials in clear solution.

Emulsifier compositions for the purpose of maintaining normally insoluble oily materials in clear, solution form in water are well-known in the prior art. Such emulsifier compositions have been used, for example, as cutting oils or the like in machine shop operation. They have also been employed in various industrial processes, such as, for example, for the cleaning of parts which are to come into contact with liquid oxygen. One important use which they have found in the industrial field has been in connection with penetrant inspection processes for the testing of machine parts for surface cracks and flaws. Here, the emulsifier compositions have been employed as water-washable oils. In similar connection, they have been employed for the cleaning and removal of water-insoluble oily materials from the surfaces of parts to be inspected.

Heretofore, the known emulsifier compositions have been formulated of mixtures of solvents such as sulphonated mineral oils of glycol ethers, along with oil-soluble soaps, such as sorbitan trioleate. A wide variety of surfactant materials have been available for use in such emulsifier formulations. However, one of the chief problems in devising such formulations has been the high cost of producing a satisfactory product which will provide a reasonable level of water tolerance of the emulsifier; i.e., which will be compatible with a reasonable proportion of water as a contaminant, while maintaining a clear, water-soluble mixture. In the case of water-washable inspection oils or emulsifier cleaners used in penetrant inspection processes, it is essential that the emulsifier tolerate contamination by water up to some practical level on the order of perhaps 5–15%. A minimum tolerance requirement has usually been on the order of about 1%. Similar water tolerance requirements must be met in other industrial applications. Such tolerance requirements have resulted from the fact that industrial process materials must frequently be used under adverse conditions, in which contamination by water can be expected. In the case of cutting oils, it is often desirable that the latter be able to tolerate dilution with water up to several hundred percent and still maintain a clear solution.

The high cost of producing satisfactory emulsifier formulations which meet the necessary water tolerance requirements has resulted, primarily, from the use in such formulations of relatively large amounts of expensive ingredients, such as sorbitan trioleate, glycol ether, or esters. It has often been possible to combine such high cost solvents with the less expensive sulphonated mineral oils. However, in some applications, the sulphonated mineral oils cannot, because of practical limitations, be employed as ingredients in the emulsifier compositions. For example, in applications in which the emulsifier is to be employed in contact with sensitive metals, such as nickel or nickel alloys, it is important that there be no sulphur or sulphur-bearing compounds used. In these applications, only the more expensive types of solvents can be employed, with obviously extremely high resultant costs. A further disadvantage of the emulsifier compositions containing very high proportions of glycol ethers, or other similar solvents, has been that they have often proved to be, in a sense, too efficient with respect to their ability to solubilize oily materials. Thus, when such emulsifier compositions have been used in penetrant inspection processes, they have tended to strip the flaw tracer indications out of the flaws.

The principal object of the present invention is to provide improved emulsifier compositions.

Another object of the invention is to provide oil-in-water type emulsifier compositions which are of relatively low cost as compared with conventional compositions of this kind.

Another object of the present invention is to provide improved emulsifier compositions capable of maintaining a clear solution despite the presence of substantial quantities of water.

Another object of the invention is to provide improved emulsifier compositions capable of maintaining a clear solution despite the addition of water thereto as a contaminant, in a volume concentration in excess of 1%.

Another object of the present invention is to provide emulsifier compositions adapted for use in penetrant inspection processes, and exhibiting the ability to wash free from the surfaces of test bodies without stripping the penetrant tracer material from the flaw entrapments.

Another object of the invention is to provide improved emulsifier compositions which are free from sulphur and sulphur bearing compounds, for the efficient solubilization of oily materials in water.

Another object of the present invention is to provide emulsifier compositions which may be adjusted with comparative ease to provide a particular desired level of water tolerance.

These and other objects of the invention will become more apparent from the following specification thereof.

In accordance with the present invention, there are provided emulsifier compositions, each of which contains a balanced combination of the following three ingredients:

(1) A glycol ether.
(2) A polyoxyethylene (ethoxylated) alkylphenol having an ethylene oxide content within the approximate range of 7–15 mols per mol of alkylphenol (Type I).
(3) A polyoxyethylene (ethoxylated) alkylphenol having an ethylene oxide content within the approximate range of 0.5 mols per mol of alkylphenol (Type II).

The glycol ether ingredient of the emulsifier composition is employed in a concentration by volume within the approximate range of 1–25%. The preferred range is approximately 2.5–15%. The glycol ethers which are suitable for the purpose are those which are normally liquid. Within the class, for example, are the following:

Ethylene glycol monobutyl ether
Diethylene glycol monobutyl ether
Ethylene glycol monoethyl ether
Diethylene glycol monoethyl ether
Ethylene glycol monomethyl ether The second basic ingredient of the composition, or Type I ethoxylated alkylphenol having an ethylene oxide content within the approximate range of 7–15 mols of ethylene oxide per mol of alkylphenol, is employed in a concentration by volume within the approximate range of .5–25%. The preferred range is approximately 1–23%.

The Type I ethoxylated alkylphenol constituent of the compositions of the invention is any one, or a combination, of the ethoxylated alkylphenols which are normally liquid. Such normally liquid alkylphenols have the following chemical structure:

In the above structure, P is a phenolic nucleus, R is an ethoxy group, and R' is an alkyl or polyalkyl chain structure.

For the purpose of this specification, a phenolic nucleus is defined as an aromatic structure containing a "phenolic" hydroxyl group (or groups), the aromatic structure being any one of the structures; benzene, naphthalene, or diphenyl (biphenyl). It has been found that any one of these three types of nucleii can be monoalkylated, dialkylated, or polyalkylated to form so-called alkylated phenols, and the number of carbon atoms in any given alkyl chain or R' group, may be as low as 5 to as high as 18; that is, for the purpose of this invention. Furthermore, the alkyl chains may occur in isomeric forms, either as straight or branched chains, depending on the mode of synthesis.

The thus-alkylated phenols are condensed with an R group which may consist of from 7 to 15 mols of ethylene oxide per mol of alkylphenol to produce the water-soluble ethoxylated alkylphenols suitable for the purpose of the invention. R may, therefore, be defined as the chemical structure $(CH_2CH_2O)_xH$, where in the case of the water-soluble ethoxylated alkylphenols of the invention $x$ may have a value of from 7 to 15.

The third basic ingredient of the composition, or Type II ethoxylated alkylphenol having an ethylene oxide content within the approximate range of 0–5 mols of ethylene oxide per mol of alkylphenol, is employed in a concentration by volume within the approximate range of .5–10%. The preferred range is approximately 1–5%.

The Type II ethoxylated alkylphenol constituent employed in the compositions of the invention has the same chemical structure as shown above; however, from zero to 5 mols of ethylene oxide per mol of alkylphenol are here provided, $x$ having a range of values from zero to 5.

An alkylphenol with zero ethoxy content is a special case representing a limiting condition of the water-insoluble class (Type II) of ethoxylated alkylphenols. The characteristic behaviour of the water-insoluble ethoxylated alkylphenols depends on the length of the ethoxy chain, and it has been demonstrated that a uniform transition of such characteristics occurs from zero ethoxy content, through fractional values of ethoxy content, up to about 5 mols of ethylene oxide per mol of alkylphenol. Within this range of ethoxy/alkylphenol mol ratios, a preferred ratio is about 1.5 mols ethylene oxide per mol of alkylphenol.

Accordingly, it will be understood that the chemical structures for the ethoxylated alkylphenols, as utilized for this invention, may include the following:

(a)

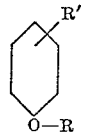

(b)

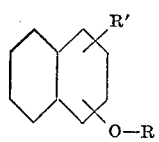

(c)

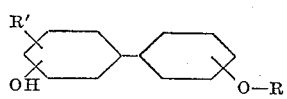

These three types of compounds, all of which may be classed as ethoxylated alkylphenols, are well-known in the science of surfactant chemistry, although industrial production, in large tonnages, is concentrated mainly on the type (a) structure, and in the monoalkylated 8 or 9 carbon alkyl chain lengths, providing ethoxylated octylphenols or ethoxylated nonylphenols.

All of the above-described ethoxylated alkylphenols behave in a closely similar manner with respect to water solubility, and the degree of water solubility, in each case, depends on the ethoxy content or mol ratio of ethylene oxide with respect to the alkylphenol portion of the material. This similarity in behaviour permits any of the three types of materials to be substituted, each for the other, in the formulations to be given in this specification, and substantially equivalent performance results will be obtained.

Among the ethoxylated alkylphenols which are suitable for the purpose of the invention are the following:

(a)

Ethoxylated diamylphenol
Ethoxylated octylphenol
Ethoxylated nonylphenol
Ethoxylated dinonylphenol
Ethoxylated trinonylphenol
Ethoxylated decylphenol
Ethoxylated didecylphenol
Ethoxylated undecylphenol
Ethoxylated dodecylphenol
Ethoxylated octyldecylphenol (b)

Ethoxylated diamylnaphthol
Ethoxylated octylnaphthol
Ethoxylated nonylnaphthol
Ethoxylated dinonylnaphthol
Ethoxylated trinonylnaphthol
Ethoxylated octyldecylnaphthol (c)

Ethoxylated diamyl p-p' biphenol
Ethoxylated octyl p-p' biphenol
Ethoxylated nonyl p-p' biphenol
Ethoxylated dinonyl p-p' biphenol
Ethoxylated octyldecyl p-p' biphenol It will be understood that any of the materials falling in the above-described categories, and which have zero ethoxy content, may be employed as Type II ethoxylated alkylphenol constituents for the purpose of the invention.

In addition to the above-discussed three basic ingredients, an oily, water-insoluble extender solvent is employed in the composition, being present in a concentration by volume within the approximate range of 50% to 95%. This ingredient serves as a filler-extender, or carrier for the previously described three essential ingredients. Any suitable, conventional, oily, normally liquid and water-insoluble solvent may be employed. There may be used any of various mineral oils, such as Base Oil—100 Pale, or #5 Engine Oil. Also usable are any of various sulphonated oils, such as sodium petroleum sulphonate having a molecular weight of approximately 460. In addition, there may be employed various of the light mineral fractions, such as diesel fuel, or kerosene. These extender solvents may be employed either individually or in combination with one another.

Although sulphonated oils; e.g., sodium petroleum sulphonates, and related materials, such as petroleum naphthenates, are water-washable or emulsifiable in water, they are, for the purpose of this specification, classed as oily water insoluble extender solvents along with other oils, such as pale oil, kerosene, and the like, particularly since the commercially obtainable sulphonated oils always contain substantial amounts of base oils or kerosene-type material.

The emulsifier composition of the invention may also include a visible color dyestuff, or a fluorescent tracer sensitizer (possibly in combination with a color-former dye). Suitable dyes for this purpose are well-known in the art, and serve as tracer dyes for the purpose of revealing the presence of small quantities of the emulsifier composition. In cases such as this, the emulsifier composition is known as a self-emulsifiable or water-washable inspection penetrant, and such composition may be used for the nondestructive testing of metal or ceramic parts for the presence of small surface cracks or other discontinuities.

The performance characteristics of each emulsifier composition of the invention depends, primarily, on the presence in the composition of the two types of ethoxylated alkylphenols, and said characteristics vary depending upon the molecular structure and the concentration of the particular alkylphenols employed. In general, the Type I ethoxylated alkylphenol, having an ethylene oxide content within the approximate range of 7–15 mols per mol of alkylphenol, imparts a positive hydrophilic character to the composition, while the Type II ethoxylated alkylphenol, having an ethylene oxide content within the approximate range of 0–5 mols per mol of alkylphenol, imparts a positive lipophilic character to the composition. Because of the unusual chemical structure of the alkylphenols, as they will be referred to in this specification, permitting controlled variations in the length of the ethoxy chains, and consequent variations in the emulsification characteristics obtained, it has been found possible, through careful balancing of mixtures of the two alkylphenol ingredients, to achieve extremely efficient oil solubilization effects.

The glycol ether ingredient acts as a solvent coupler, in conjunction with the alkylphenol ingredients, for the coupling of water into clear solution with the oily extender solvent.

I have discovered that through a proper balancing of the concentrations used of the above-described three basic ingredients of the compositions of the invention, water-soluble mixtures can be formulated which are adapted to tolerate in clear solution the addition of water as a contaminant in excess of 1%. I have also discovered that the proper balance of ingredients must be achieved within a given set of ranges of concentration, which is specific for each combination of the various ingredients. The most critical of the concentration ranges representing the balanced condition of any given combination of ingredients is that of the Type II alkylphenol. This fact can best be illustrated by observing the effects that changes in the Type II alkylphenol concentration can have on a given mixture which is in balanced condition, and contains water in excess of 1%. For example, assuming such a balanced condition, and that the concentrations of the glycol ether and Type I alkylphenol are maintained constant, if the concentration of Type II alkylphenol is reduced below a certain critical limit, the mixture will develop a haze, or a phase separation; i.e., the liquid will separate into distinct layers, which are miscible, but not soluble in each other.

On the other hand, if the concentration of the Type II alkylphenol is increased above a certain critical limit, the mixture will become relatively insoluble in water, and will, as a result, not wash cleanly from surfaces when rinsed with water. The balanced condition can thus be defined in terms of the above-discussed limits regarding the concentration of Type II alkylphenol which can be employed. It has been found that the concentration of Type II alkylphenol is always equal to, or less than that of the Type I alkylphenol, when the two ingredients are present in concentrations corresponding to a balanced condition. The Type II alkylphenol may then be present in a concentration as low as one-fifth that of the Type I alkylphenol; or in a concentration as high as to be equal to that of the Type I alkylphenol. However, the Type II alkylphenol will, in most cases, be present in a concentration within the approximate range of one-third to one-half of that of the Type I alklphenol. In any case, as previously pointed out, the Type I alklyphenol will be present in a concentration within the approximate range of .5% to 25%; while the Type II alkylphenol will be present in a concentration within the approximate range of .5% to 10% of the total mixture.

I have discovered that optimum results are obtained when a Type I alkylphenol compound having about 9–10 mols of ethylene oxide per mol of the phenolic derivative is employed in conjunction with a Type II alkylphenol having about 1–2 mols of ethylene oxide per mol of the phenolic derivative. However, as already indicated, these mol ratios may be varied within the approximate range of 7–15 for the Type I alkylphenol; and within the approximate range of 0–5 for the Type II alkylphenol. The Type I alkylphenol, in view of the specified mol ratio range therefor, has some degree of water solubility; while the Type II alkylphenol, in view of the specified mol ratio therefor, is insoluble in water, and compatible with oily solvents. The concentration ranges of both the Type I and Type II alkylphenols will, for a given application, depend in part on the relative concentration of the glycol ether (which, as indicated above, may be within the approximate range of 1–25%).

In order to provide an emulsifier composition in accordance with the invention, and having a predetermined desired water tolerance, any group of three of the above-discussed basic ingredients of the composition along with an extender solvent of the type already described, may be selected. The particular ingredients employed will, in most cases, be selected on the basis of their availability, cost, convenience of use (e.g., odor, flash point, etc.), or other practical factors.

In arriving at a balanced mixture, using any particular selected ingredients, convenient production quantities (e.g., a few drums each) of the selected glycol ether, a selected Type I alkylphenol, and a selected oily extender solvent are first mixed together. A test sample in a convenient amount (e.g., 100 cc.) is then selected. To the test sample is added a quantity of water in a percentage concentration equal to the ultimately desired water tolerance of the finished emulsifier composition (e.g., 5%). The mixture will immediately become cloudy, as a result of phase separation. The Type II alkylphenol is then added to the mixture, in small increments (e.g., 0.1%). After each addition, the test mixture is stirred and examined. Following some particular increment of addition (e.g., after addition of 2% of the Type II alkylphenol), it will be observed that the mixture clarifies. This will indicate that the mixture is then compatible with water up to the desired degree of tolerance (here, 5%), and is also water soluble. If clarification is not attained by the time of addition of an amount of the Type II alkylphenol equal to the amount of Type I alkylphenol present in the mixture, this is an indication that the concentration of the Type I alkylphenol and/or the concentration of the glycol ether must be increased. This results from the fact that, as pointed out above, the amount of Type II alkylphenol should not exceed the amount of Type I alkylphenol present in the mixture. Any changes in concentration made at this point may be made with consideration being given to possible savings in the cost of the ingredients used.

On the basis of the above procedure, as applied to the test sample, the proportions of the various ingredients of the mixture when in balanced condition to be used are determined. The bulk of the mixture itself is then adjusted as to the proportions of the ingredients thereof, in accordance with the determination made on the sample.

If it is desired to test the water compatibility of any of the finished emulsifier compositions of the invention, this may be accomplished by simply adding water thereto in gradual increments, until a percentage of addition is reached at which the mixture begins to thicken or "breaks" into an emulsion. This percentage of addition of water is a direct measure of the water compatibility of the composition.

If the water solubility of any of the emulsifier compositions of the invention is to be tested, such may be determined by the conventional procedure of placing a few drops of the composition on a panel, and washing in a stream of water. If the panel washes completely clean, this is an indication of water-solubility; whereas, if any of the composition remains on the panel, there is obviously some degree of water-insolubility.

*Example I*

It was required to construct a water-washable inspection penetrant employing kerosene as the oily extender; and having a water tolerance requirement of about 7–9%. The material was to be made in a 12-drum batch. An emulsifier composition in accordance with the invention was prepared in the following manner: An original batch of material having the following concentration was mixed together:

| | Parts by volume |
|---|---|
| Ethylene glycol monobutyl ether, (1 drum) | 8.33 |
| Ethoxylated monylphenol—9.5 mols ethylene oxide content (2 drums) | 16.67 |
| No. 410 thinner (a refined kerosene) | 70.00 |
| Indicator dye—as desired. | |

100 cc. of the above mixture were taken as a sample; 8 cc. of water were added thereto. Ethoxylated nonylphenol (1.5 mols ethylene oxide content) was then added to the sample in gradual increments of 0.1 cc. each. It was discovered that, upon the total addition of 2 cc. of the Type II alkylphenol, the test sample became clear.

The total batch of material was then adjusted by addition of Type II alkylphenol, so as to contain about 2% of the latter. Refined kerosene was then added to the mixture, to bring the latter up to a total of 100 parts.

100 cc. of the final mixture were then tested for water compatibility by the addition thereto of water in increments of 1 cc. each. It was found that the mixture remained clear up to and including the addition in total of 8% water.

When more water than this was added, the mixture broke into an emulsion.

A few drops of the final mixture were placed on an aluminum panel, and the panel was washed in water. Examination of the panel then revealed that the drops of the mixture had been completely removed. This indicated that the mixture was water-washable.

*Example II*

An emulsifier composition having the following formulation was prepared:

| | Parts by volume |
|---|---|
| Diesel fuel | 75.0 |
| Ethylene glycol monoethyl ether | 4.3 |
| Ethoxylated octylphenol (9.5 mols ethylene oxide content) | 16.7 |
| Nonylphenol (0 mols ethylene oxide content) | 4.0 |

The above formulation will tolerate upwards of 10% of water (at room temperature) while maintaining a clear solution and remaining soluble and washable in water.

*Example III*

A typical cleaning emulsifier having the following formulation was prepared:

| | Parts by volume |
|---|---|
| Diethylene glycol monobutyl ether | 11.6 |
| Ethoxylated nonylnaphthol (9.5 mols ethylene oxide content) | 23.4 |
| Ethoxylated decylphenol (1.5 mols ethylene oxide content) | 7.0 |
| Kerosene | 58.0 |

The above formulation is particularly effective for solubilizing oils or oily materials, and is capable of absorbing 35% or more of its own volume of mineral oil or similar material, while remaining washable in water. The water tolerance of this formulation is upwards of 10%.

*Example IV*

A cleaning emulsifier was prepared having the following formulation:

| | Parts by volume |
|---|---|
| Ethylene glycol monobutyl ether | 3.7 |
| Ethoxylated octyl p-p′ biphenol (9.5 mols ethylene oxide content) | 1.85 |
| Ethoxylated dinonyl naphthol (2 mols ethylene oxide content) | 1.85 |
| Sodium petroleum sulphonate | 15.6 |
| Base Oil—100 Pale | 77.0 |

This emulsifier employs sodium petroleum sulphonate as a solubilization assistant. This emulsifier product will absorb and render soluble in water as much as 25% of its own volume of oil or oil-like material, and will tolerate more than 10% of water contamination while maintaining a clear solution.

*Example V*

The following oil stripping cleaner was prepared:

| | Parts by volume |
|---|---|
| Ethylene glycol monobutyl ether | 2.7 |
| Ethoxylated nonylphenol (9.5 mols ethylene oxide content) | 1.15 |
| Ethoxylated nonylphenol (1.5 mols ethylene oxide content) | 1.15 |
| Sodium petroleum sulphonate | 63.0 |
| Base Oil—100 Pale | 32.0 |

The above composition is capable of absorbing substantial quantities of oily materials and maintaining them in clear solution form even at dilutions in water up to 800% or more.

*Example VI*

An emulsifier in accordance with the invention was prepared having the following constitution:

| | Parts by volume |
|---|---|
| Ethylene glycol monobutyl ether | 8.3 |
| Ethoxylated octylphenol (9.5 mols ethylene oxide content) | 16.7 |
| Ethoxylated dinonylphenol (2.34 mols ethylene oxide content) | 4.0 |
| Refined kerosene | 71.0 |

A water washable penetrant inspection liquid was prepared by adding to the above mixture a conventional dye. The water tolerance of the above mixture is approximately 10%.

*Example VII*

An emulsifier composition in accordance with the invention was prepared as follows:

| | Parts by volume |
|---|---|
| Ethylene glycol monobutyl ether | 8.5 |
| Ethoxylated nonyl p-p′ biphenol (9.5 mols ethylene oxide content) | 17.0 |
| Ethoxylated dodecylphenol (1.85 mols ethylene oxide content) | 3.5 |
| Refined kerosene | 71.0 |

The above composition tolerates about 10% of water. It can especially be employed as a cleaning emulsifier, or as a water-washable penetrant inspection material if an indicator dye is added thereto.

Changes in any of the above examples can be made, with respect to the particular glycol ether employed, or the particular extender solvent employed. Such changes, or substitutions, will require only minor changes in the percentage concentrations of the ingredients substituted.

Although the invention has been described with reference to particular embodiments thereof, it will be understood that various changes and modifications may be made therein, without departing from the spirit of the invention nor the scope of the appended claims.

I claim:

1. A water-soluble emulsifier composition comprising a normally liquid glycol ether in a volume concentration within the approximate range of 1%–25%, a normally liquid ethoxylated alkylphenol having an ethylene oxide content within the approximate range of 7–15 mols ethylene oxide per mol of alkylphenol and being present in a volume concentration within the approximate range of .5%–25%, a normally liquid ethoxylated alkylphenol having an ethylene oxide content within the approximate range of zero to 5 mols ethylene oxide per mol of alkylphenol and being present in a volume concentration within the approximate range of .5%–10%, and an oily, water-insoluble extender solvent, said composition being adapted to tolerate in clear solution the addition of water in excess of 1%.

2. A water-soluble emulsifier composition comprising a normally liquid glycol ether in a volume concentration within the approximate range of 1%–25%, a normally liquid polyoxyethylene alkylphenol having an ethylene oxide content within the approximate range of 7–15 mols ethylene oxide per mol of alkylphenol and being present in a volume concentration within the approximate range of .5%–25%, a normally liquid polyoxyethylene alkylphenol having an ethylene oxide content within the approximate range of 1–5 mols of ethylene oxide per mol of alkylphenol and being present in a volume concentration within the approximate range of .5%–10%, and an oily, water-insoluble extender solvent, said composition being adapated to tolerate in clear solution the addition of water in excess of 1%.

3. A water-soluble emulsifier composition comprising a normally liquid glycol ether in a volume concentration within the approximate range of 1%–25%, a normally liquid polyoxyethylene alkylphenol having an ethylene oxide content within the approximate range of 9–10 mols ethylene oxide per mol of alkylphenol and being present in a volume concentration within the approximate range of .5%–25%, a normally liquid polyoxyethylene alkylphenol having an ethylene oxide content within the approximate range of 1–2 mols of ethylene oxide per mol of alkylphenol and being present in a volume concentration within the approximate range of .5%–10%, in an oily, water-insoluble extender solvent, said composition being adapted to tolerate in clear solution the addition of water in excess of 1%.

4. A water-soluble emulsifier composition comprising a normally liquid glycol ether in a volume concentration within the approximate range of 2.5%–15%, a normally liquid polyoxyethylene alkylphenol having an ethylene oxide content within the approximate range of 7–15 mols ethylene oxide per mol of alkylphenol and being present in a volume concentration within the approximate range of 1%–23%, a normally liquid polyoxyethylene alkylphenol having an ethylene oxide content within the approximate range of 1–5 mols of ethylene oxide per mol of alkylphenol and being present in a volume concentration within the approximate range of 1%–5%, and an oily, water-insoluble extender solvent, said composition being adapted to tolerate in clear solution the addition of water in excess of 1%.

5. A water-soluble emulsifier composition comprising a normally liquid glycol ether in a volume concentration within the approximate range of 2.5%–15%, a normally liquid polyoxyethylene alkylphenol having an ethylene oxide content within the approximate range of 9–10 mols ethylene oxide per mol of alkylphenol and being present in a volume concentration within the approximate range of 1%–23%, a normally liquid polyoxyethylene alkylphenol having an ethylene oxide content within the approximate range of 1–2 mols of ethylene oxide per mol of alkylphenol and being present in a volume concentration within the approximate range of 1%–5%, and an oily, water-insoluble extender solvent, said composition being adapted to tolerate in clear solution the addition of water in excess of 1%.

6. A water-soluble emulsifier composition comprising a normally liquid glycol ether in a volume concentration within the approximate range of 1%–25%, a normally liquid polyoxyethylene alkylphenol having an ethylene oxide content within the approximate range of 7–15 mols ethylene oxide per mol of alkylphenol and being present in a volume concentration within the approximate range of .5%–25%, a normally liquid polyoxyethylene alkylphenol having an ethylene oxide content within the approximate range of 1–5 mols of ethylene oxide per mol of alkylphenol and being present in a volume concentration within the approximate range of .5%–10%, a tracer dye, and an oily, water-insoluble extender solvent, said composition being adapted to tolerate in clear solution the addition of water in excess of 1%.

7. A water-soluble emulsifier composition comprising a normally liquid glycol ether in a volume concentration within the approximate range of 1%–25%, a first normally liquid polyoxyethylene alkylphenol having an ethylene oxide content within the approximate range of 7–15 mols ethylene oxide per mol of alkylphenol and being present in a volume concentration within the approximate range of .5%–25%, a second normally liquid polyoxyethylene alkylphenol having an ethylene oxide content within the approximate range of 1–5 mols of ethylene oxide per mol of alkylphenol and being present in a volume concentration within the approximate range of .5%–10%, said second polyoxyethylene alkylphenol being present within the approximate range of one-third to one-half of the concentration of said first polyoxyethylene alkylphenol, and an oily, water-insoluble extender solvent, said composition being adapted to tolerate in clear solution the addition of water in excess of 1%.

8. A water-soluble emulsifier composition comprising a normally liquid glycol ether in a volume concentration within the approximate range of 1%–25%, a normally liquid polyoxyethylene alkylphenol having an ethylene oxide content within the approximate range of 7–15 mols ethylene oxide per mol of alkylphenol and being present in a volume concentration within the approximate range of .5%–25%, a normally liquid polyoxyethylene alkylphenol having an ethylene oxide content within the approximate range of 0–1 mols of ethylene oxide per mol of alkylphenol and being present in a volume concentration within the approximate range of .5%–10%, and an oily, water-insoluble extender solvent, said composition being adapted to tolerate in clear solution the addition of water in excess of 1%.

9. A water-soluble emulsifier composition comprising a normally liquid glycol ether in a volume concentration within the approximate range of 2.5%–15%, a normally liquid polyoxyethylene alkylphenol having an ethylene oxide content within the approximate range of 7–15 mols ethylene oxide per mol of alkylphenol and being present in a volume concentration within the approximate range of 1%–23%, a normally liquid polyoxyethylene alkylphenol having an ethylene oxide content within the approximate range of 0–1 mols of ethylene oxide per mol of alkylphenol and being present in a volume concentration within the approximate range of 1%–5%, and an oily, water-insoluble extender solvent, said composition being adapted to tolerate in clear solution the addition of water in excess of 1%.

10. A water-soluble emulsifier composition comprising a normally liquid glycol ether in a volume concentration within the approximate range of 1%–25%, a normally liquid polyoxyethylene alkylphenol having an ethylene oxide content within the approximate range of 7–15 mols ethylene oxide per mol of alkylphenol and being present in a volume concentration within the approximate range of .5%–25%, a normally liquid polyoxyethylene alkylphenol having an ethylene oxide content within the approximate range of 0–1 mols of ethylene oxide per mol of alkylphenol and being present in a volume concentration within the approximate range of .5%–10%, a tracer dye, and an oily, water-insoluble extender solvent, said composition being adapted to tolerate in clear solution the addition of water in excess of 1%.

11. A water-soluble emulsifier composition comprising a normally liquid glycol ether in a volume concentration within the approximate range of 1%–25%, a first normally liquid polyoxyethylene alkylphenol having an ethylene oxide content within the approximate range of 7–15 mols ethylene oxide per mol of alkylphenol and being present in a volume concentration within the approximate range of .5%–25%, a second normally liquid polyoxyethylene alkylphenol having an ethylene oxide content within the approximate range of 0–1 mols of ethylene oxide per mol of alkylphenol and being present in a volume concentration within the approximate range of .5%–10%, said second polyoxyethylene alkylphenol being present within the approximate range of one-third to one-half of the concentration of said first polyoxyethylene alkylphenol, and an oily, water-insoluble extender solvent, said composition being adapted to tolerate in clear solution the addition of water in excess of 1%.

12. A water-soluble emulsifier composition in accordance with claim 1 in which at least one of said ethoxylated alkylphenols is a member selected from the group consisting of—
Ethoxylated diamylphenol
Ethoxylated octylphenol
Ethoxylated nonylphenol
Ethoxylated dinonylphenol
Ethoxylated trinonylphenol
Ethoxylated decylphenol
Ethoxylated didecylphenol
Ethoxylated undecylphenol
Ethoxylated dodecylphenol
Ethoxylated octyldecylphenol 13. A water-soluble emulsifier composition in accordance with claim 1 in which at least one of said ethoxylated alkylphenols is a member selected from the group consisting of—
Ethoxylated diamylnaphthol
Ethoxylated octylnaphthol
Ethoxylated dinonylnaphthol
Ethoxylated trinonylnaphthol
Ethoxylated octyldecylnaphthol 14. A water-soluble emulsifier composition in accordance with claim 1 in which at least one of said ethoxylated alkylphenols is a member selected from the group consisting of—
Ethoxylated diamyl p-p' biphenol
Ethoxylated octyl p-p' biphenol
Ethoxylated nonyl p-p' biphenol
Ethoxylated dinonyl p-p' biphenol
Ethoxylated octyldecyl p-p' biphenol 15. A water-soluble emulsifier composition in accordance with claim 6 in which at least one of said ethoxylated alkylphenols is a member selected from the group consisting of—
Ethoxylated diamylphenol
Ethoxylated octylphenol
Ethoxylated nonylphenol
Ethoxylated dinonylphenol
Ethoxylated trinonylphenol
Ethoxylated decylphenol
Ethoxylated didecylphenol
Ethoxylated undecylphenol
Ethoxylated dodecylphenol
Ethoxylated octyldecylphenol 16. A water-soluble emulsifier composition in accordance with claim 6 in which at least one of said ethoxylated alkylphenols is a member selected from the group consisting of—
Ethoxylated diamylnaphthol
Ethoxylated octylnaphthol
Ethoxylated dinonylnaphthol
Ethoxylated trinonylnaphthol
Ethoxylated octyldecylnaphthol 17. A water-soluble emulsifier composition in accordance with claim 6 in which at least one of said ethoxylated alkylphenols is a member selected from the group consisting of—
Ethoxylated diamyl p-p' biphenol
Ethoxylated octyl p-p' biphenol
Ethoxylated nonyl p-p' biphenol
Ethoxylated dinonyl p-p' biphenol
Ethoxylated octyldecyl p-p' biphenol 18. A water-soluble emulsifier composition in accordance with claim 10 in which at least one of said ethoxylated alkylphenols is a member selected from the group consisting of—
Ethoxylated diamylphenol
Ethoxylated octylphenol
Ethoxylated nonylphenol
Ethoxylated dinonylphenol
Ethoxylated trinonylphenol
Ethoxylated decylphenol
Ethoxylated didecylphenol
Ethoxylated undecylphenol
Ethoxylated dodecylphenol
Ethoxylated octyldecylphenol 19. A water-soluble emulsifier composition in accordance with claim 10 in which at least one of said ethoxylated alkylphenols is a member selected from the group consisting of—
Ethoxylated diamylnaphthol
Ethoxylated octylnaphthol
Ethoxylated dinonylnaphthol
Ethoxylated trinonylnaphthol
Ethoxylated octyldecylnaphthol 20. A water-soluble emulsifier composition in accordance with claim 10 in which at least one of said ethoxylated alkylphenols is a member selected from the group consisting of—
Ethoxylated diamyl p-p' biphenol
Ethoxylated octyl p-p' biphenol
Ethoxylated nonyl p-p' biphenol
Ethoxylated dinonyl p-p' biphenol
Ethoxylated octyldecyl p-p' biphenol

References Cited by the Examiner

UNITED STATES PATENTS

| | | | |
|---|---|---|---|
| 2,402,373 | 6/1946 | Cordero | 252—49.5 X |
| 2,948,681 | 8/1960 | Milberger et al. | 252—49.5 |
| 3,024,198 | 3/1962 | Harrington et al. | 252—49.5 |

FOREIGN PATENTS

| | | |
|---|---|---|
| 593,988 | 3/1960 | Canada. |
| 716,641 | 10/1954 | Great Britain. |

DANIEL E. WYMAN, *Primary Examiner.*

P. P. GARVIN, *Assistant Examiner.*